United States Patent
Karve et al.

(10) Patent No.: US 11,520,588 B2
(45) Date of Patent: Dec. 6, 2022

(54) PREFETCH FILTER TABLE FOR STORING MODERATELY-CONFIDENT ENTRIES EVICTED FROM A HISTORY TABLE

(71) Applicant: International Business Machines Corporation, Armonk, NY (US)

(72) Inventors: Mohit Karve, Austin, TX (US); Edmund Joseph Gieske, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 16/435,651

(22) Filed: Jun. 10, 2019

(65) Prior Publication Data

US 2020/0387381 A1   Dec. 10, 2020

(51) Int. Cl.
- *G06F 9/38* (2018.01)
- *G06F 12/0862* (2016.01)

(52) U.S. Cl.
CPC ............ *G06F 9/3802* (2013.01); *G06F 9/383* (2013.01); *G06F 12/0862* (2013.01); *G06F 2212/6024* (2013.01)

(58) Field of Classification Search
CPC .... G06F 9/3802; G06F 9/383; G06F 12/0862; G06F 2212/6024
See application file for complete search history.

(56) References Cited

U.S. PATENT DOCUMENTS

| | | | |
|---|---|---|---|
| 7,707,396 B2 | 4/2010 | Bradford et al. | |
| 8,683,136 B2 | 3/2014 | Cherukuri et al. | |
| 2001/0016903 A1* | 8/2001 | Tremblay | G06F 9/3844 712/239 |
| 2013/0339617 A1* | 12/2013 | Averbouch | G06F 12/0862 711/E12.07 |
| 2015/0106590 A1* | 4/2015 | Chou | G06F 9/30072 712/207 |
| 2015/0121038 A1 | 4/2015 | Dasika et al. | |
| 2018/0329823 A1 | 11/2018 | Brekelbaum et al. | |

(Continued)

OTHER PUBLICATIONS

Zhuang et al., "A Hardware-based Cache Pollution Filtering Mechanism for Aggressive Prefetches", 2003, 8 pages.*

(Continued)

*Primary Examiner* — David J. Huisman
(74) *Attorney, Agent, or Firm* — Daniel M. Yeates (57) ABSTRACT

Disclosed is a computer-implemented method to increase the efficiency of a prefetch system. The method includes receiving a system call including an instruction address. The method includes determining a confidence score. The method further includes creating an entry, including the instruction address, an associated data address, and the confidence score. The method includes determining the instruction address is not present in a history table, where the history table includes a plurality of entries. The method further includes determining, in response to adding the first entry to the history table, a second entry is evicted from the history table. The method includes entering the second entry into a filter table in response to determining the second confidence score is a moderate confidence score, where the moderate confidence score is any confidence score that is greater than a predefined low threshold and less than a predefined high threshold.

15 Claims, 6 Drawing Sheets

(56) References Cited

U.S. PATENT DOCUMENTS

2019/0065375 A1\* 2/2019 Al Sheikh ............. G06F 9/3455
2020/0082280 A1\* 3/2020 Orion .................. G06F 12/0862

OTHER PUBLICATIONS

Srinath et al., "Feedback Directed Prefetching: Improving the Performance and Bandwidth-Efficiency of Hardware Prefetchers", 2007, pp. 63-74.\*

Seshradi et al., "Mitigating Prefetcher-Caused Pollution Using Informed Caching Policies for Prefetched Blocks", 2015, pp. 1-22.\*

Bera, "Mitigating Prefetcher-Caused Pollution Using Informed Caching Policies for Prefetched Blocks", Jan. 3, 2017, 51 pages.\*

Liu et al., "CDPM: Context-Directed Pattern Matching Prefetching to Improve Coarse-Grained Reconfigurable Array Performance", IEEE Transactions on Computer-Aided Design of Integrated Circuits and Systems, Aug. 31, 2017, 14 pages.

Torrents, M., "Improving Prefetching Mechanisms for Tiled CMP Platforms", This dissertation is submitted for the degree of Doctor of Philosophy, Sep. 2016, 174 pages.

Luk et al., "Architectural and Compiler Support for Effective Instruction Prefetching: A Cooperative Approach", ACM Transactions on Computer Systems, vol. 19, No. 1, Feb. 2001, pp. 71-109.

IBM, "Selective Prefetching Based on Miss Latency", An IP.com Prior Art Database Technical Disclosure, IP.com No. IPCOM000106289D, IP.com Electronic Publication Date: Mar. 20, 2005, 3 pages.

\* cited by examiner

PREFETCH FILTER TABLE FOR STORING MODERATELY-CONFIDENT ENTRIES EVICTED FROM A HISTORY TABLE

BACKGROUND

The present disclosure relates to operating systems, and, more specifically, to the prefetching of data.

In many modern computing systems one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. Many versions of modern architecture use levels of memory to increase the efficiency of the overall system. There is a long-term storage, usually larger capacity but relatively slow, and short-term storage (e.g., random access memory (RAM), cache, etc.) that are much faster but can have a relatively small capacity.

SUMMARY

Disclosed is a computer-implemented method to increase the efficiency of a prefetch system, the method comprising receiving a first system call, wherein the first system call includes a first instruction address. The method also comprises determining a first confidence score, wherein the first confidence score represents a likelihood a first associated data address that is referenced by the first instruction address will be processed. The method further comprises creating a first entry comprising the first instruction address, the first associated data address, and the first confidence score. The method includes adding the first entry to the history table. The method comprises determining, in response to adding the first entry to the history table, a second entry, which includes a second instruction adress, a second data address, and a second confidence score, is evicted from the history table. The method comprises entering the second entry into a filter table, wherein the entering of the second entry into the filter table is in response to determining the second confidence score is a moderate confidence score, wherein the moderate confidence score is any confidence score that is greater than a predefined low threshold and less than a predefined high threshold. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relates to operating systems, and, more specifically, to the prefetching of data. Aspects of the present disclosure may be better appreciated in light of the aforementioned applications.

In many modern computing systems, one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. Many versions of modern architecture use multiple levels (e.g., tiers) of memory to increase the efficiency of the overall system. Generally, there is a long-term storage, usually larger capacity but relatively slow, and short-term storage (e.g., random access memory (RAM), cache, etc.) that are much faster but can have a relatively small capacity. For purposes of this disclosure, the short-term, faster memory will be referred to as a cache (or memory cache).

In general, computing systems operate by performing the instructions of an application. One example of this process can be: 1) the application sends a system call to a processor, where the system call includes the physical location where the code is stored (e.g., instruction address). 2) The processor queries the cache to see if the data is already in the cache. If it is, the instructions are processed. 3) If not, the data is fetched from a long-term storage, written into the cache, and processed. Processing data from the long-term storage is much slower than reading data from the cache.

Embodiments of the present disclosure recognize prefetching data can increase the overall efficiency of the computing system. Data prefetching is a process by which the computing system attempts to predict future data that will be executed based on current instructions, current data, historical usage, and other similar factors, and then reading the future data into the cache in anticipation of a request to do so. Instruction address-based prefetchers are used to prefetch data memory by identifying access patterns by one or more applications. Prefetching can be resource intensive, and, if not done effectively, can have a detrimental effect on the efficiency of the computing system. In some embodiments, prefetchers use a confidence score to maintain the efficiency of prefetch systems. The confidence score can indicate the confidence an associated data address will be called for in response to the current instructions.

As processor streams are executed, instruction address entries are created and stored in an instruction address history table (history table). Each entry may include: an instruction address, one or more potential associated data address(es), a confidence score, and/or various other data. Prefetch systems are more effective when the history table is filled with entries having either a high confidence score or a low confidence score. The closer to the boundaries (e.g., high or low) the more effective the prefetch system. An entry with a high confidence score causes prefetching to occur and saves time and computing resources. An entry with a low confidence score prevents prefetching from occurring, thereby preventing polluting the cache with excess unneeded data. Embodiments of the present disclosure recognize entries containing moderate confidence scores can reduce the usefulness of prefetch systems.

Embodiments of the present disclosure may improve the efficiency of the prefetch system by using a filter table. The filter table may have a set of entries containing moderate confidence scores. The prefetch system can check an instruction address against the filter table. If the instruction address is present in the filter table, the prefetch system can prevent the entry containing a moderate confidence level from displacing an entry containing a high and/or low confidence level from the history table. Thus, the history table can maintain more entries with high and low confidence levels, thereby increasing the efficiency of the system.

In some embodiments, the prefetch system recognizes when a moderate confidence entry is evicted from the history table, and subsequently adds it to the filter table. Thus, the next time that instruction address is read, it will be compared against the filter table and prevented from re-entering the history table.

The aforementioned advantages are example advantages, and embodiments exist that can contain all, some, or none of the aforementioned advantages while remaining within the spirit and scope of the present disclosure.

Figure 1:
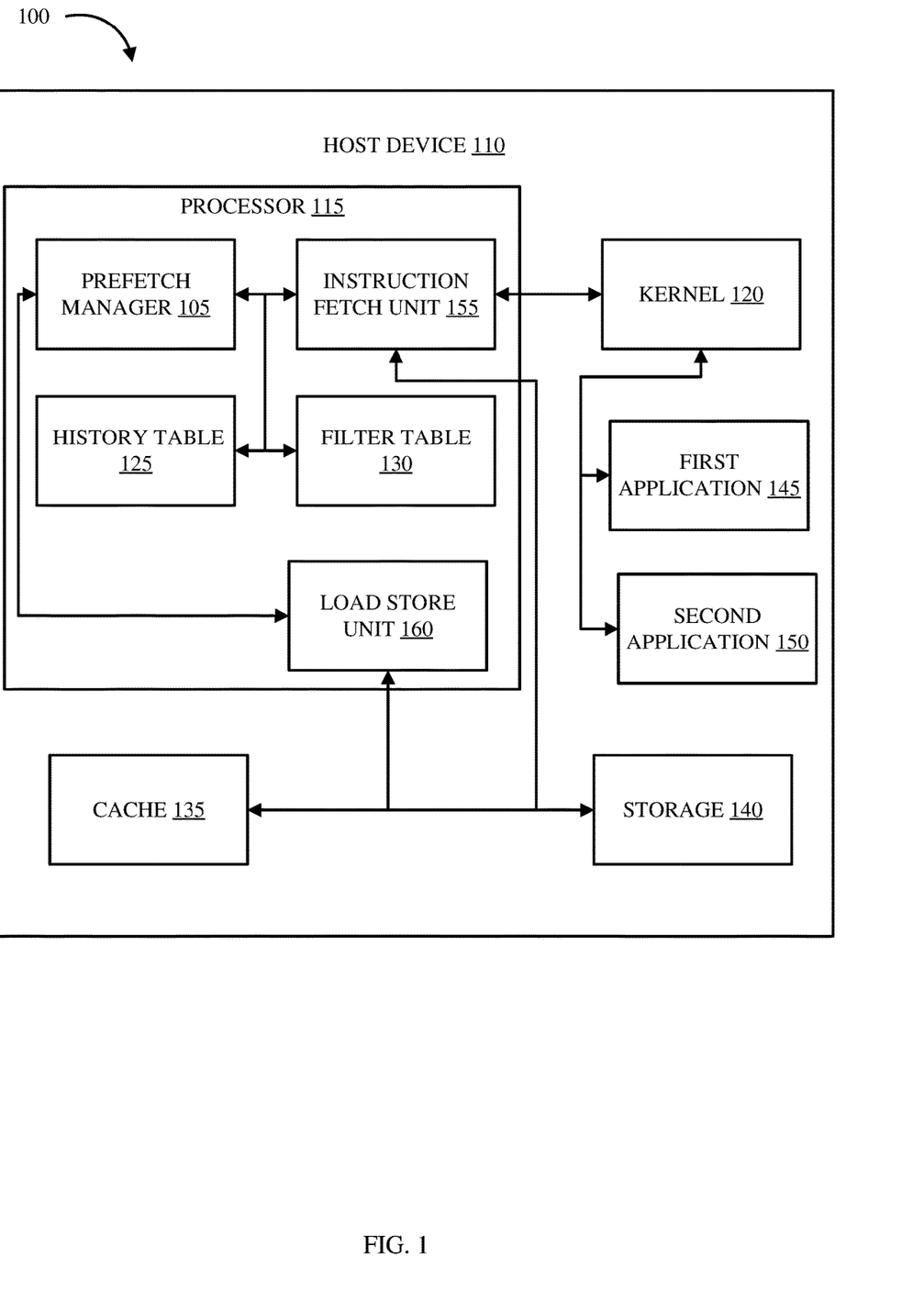
FIG. 1 illustrates a functional diagram of an example computing environment suitable for operation of a prefetch manager, in accordance with some embodiments of the present disclosure.

Referring now to various embodiments of the disclosure in more detail, FIG. 1 is a representation of a computing environment 100 that is capable of running a prefetch manager 105, in accordance with one or more embodiments of the present disclosure. Many modifications of the depicted environment may be made by those skilled in the art without departing from the scope of the disclosure as recited by the claims.

Computing environment 100 includes host device 110. Host device 110 can be a standalone computing device, a management server, a web server, a mobile computing device, or any other electronic device or computing system capable of receiving, sending, and processing data. In other embodiments, host device 110 can represent a server computing system utilizing multiple computers as a server system, such as in a cloud computing environment. In some embodiments, host device 110 represents a computing system utilizing clustered computers and components (e.g., database server computers, application server computers, etc.) that act as a single pool of seamless resources when accessed within computing environment 100. In some embodiments host device 110 includes prefetch manager 105, processor 115, kernel 120, history table 125, filter table 130, cache 135, storage 140, first application 145, and second application 150.

Processor 115 can be any combination of hardware and/or software configured to execute program instructions provided by an application (e.g., first application 145, second application 150, etc.). In some embodiments, processor 115 is comprised of two or more processors (or cores) working in unison. In some embodiments, processor 115 can perform operations including, reading data from memory (e.g., storage 140), writing data to memory (e.g., cache 135, storage 140), processing data, fetching data, prefetching data, etc. Processor 115 can be communicatively coupled to other components within host device 110. In some embodiments, processor 115 can exchange data with kernel 120, cache 135, and storage 140. In some embodiments, processor 115 includes prefetch manager 105, history table 125, filter table 130, instruction fetch unit 155 (IFU), and load store unit 160 (LSU)

History table 125 can be any combination of hardware and/or software configured to store information relating to information flow through one or more processors 115. In some embodiments, history table 125 stores the information as one or more entries. In some embodiments, history table 125 includes an instruction address and a confidence score. In some embodiments, each entry includes an instruction address, one or more associated data address(es), and a confidence score. The confidence score can be high, low, or moderate.

In some embodiments, a three-bit confidence score is used (e.g., 0 to 7). However, other methods and sizes of confidence scores can be used. A high confidence score may indicate that the associated data address that will be used is known, and/or that there is a consistent pattern of usage related to the specific instruction address. For example, say first application 145 processes line eleven immediately after processing line ten without exception. The entry in history table 125 for data address of line ten would include a high confidence with line eleven as the associated data address. A low confidence may indicate random associated data address (e.g., pointer-chasing access pattern). A moderate confidence score (e.g., 3 out of 7) may indicate an associated data address is predictable about half of the time.

The instruction address may include which section of storage (e.g., storage 140) an instruction is located. The confidence score may represent the likelihood that an associated data address will be processed as a result of the current instruction address.

Filter table 130 can be any combination of hardware and/or software configured to store information relating to information flow through one or more processors. In some embodiments, filter table 130 stores the information as one or more entries. In some embodiments, filter table 130 is included in prefetch manager 105. In some embodiments, filter table 130 includes information about entries that have been evicted from history table 125. In some embodiments, the entries in filter table 130 can contain less information than the entries in history table 125.

Filter table 130 may include entries that have a moderate confidence score (e.g., not at the extremes, a confidence of 3 out of a max of 7). Moderate confidence scores can be defined in various ways. A confidence score can be considered moderate based on predetermined values. For example, if possible confidence scores ranged from 0 to 7, then only scores of 3 and 4 could be considered moderate. A confidence score can be considered moderate if it is more moderate relative to the other scores in filter table 130. If a confidence score of 4 is the midpoint, then an entry with a confidence of 3 could displace an entry with a confidence of 2 for being classified as moderate. In some embodiments, the confidence score is one of the factors that determines if an entry should be placed in filter table 130. Other factors can include: the amount of time an entry has been in the table, time since the entry's instruction address has been processed, whether the program (e.g., first application 145) that requested the instruction address is still operating, etc.

In some embodiments, filter table 130 includes a bloom filter. A bloom filter is a memory efficient data structure designed to detect whether an element is within a set.

In some embodiments, entries in filter table 130 are removed. They can be removed by being displaced by new more relevant entries. They can be removed after certain conditions are met. The conditions can be time (e.g., 15 minutes), number of cycles, number of hits, or other similar parameters.

Instruction fetch unit 155 can be any combination of hardware and/or software configured to fetch data for a stream. The stream can be a software instruction stream. In some embodiments, the one or more streams are initiated by first application 145 (or second application 150) via kernel 120.

Load store unit 160 can be any combination of hardware and/or software configured to execute data memory access commands (including prefetch commands). In some embodiments, load store unit 160 is directed by prefetch manager 105. In some embodiments, load store unit 160 brings in data from memory and is directed by prefetch manager 105 to prefetch or not prefetch associated data.

Kernel 120 can be any combination of hardware and software capable of managing the workload of host device 110 and provide access to low-level operating components of the host device 110. In some embodiments, kernel 120 receives system calls from one or more applications (e.g., first application 145, second application 150, etc.) requesting resources of host device 110. In these embodiments, kernel 120 prioritizes and executes the system calls based on one or more algorithms. In some embodiments, kernel 120 is part of the operating system of host device 110. Kernel 120 can be communicatively coupled to the other components of host device 110. In some embodiments, kernel 120 includes prefetch manager 105, however FIG. 1 shows prefetch manager 105 as a separate component for the sake of discussion.

In some embodiments, kernel 120 includes a queue of instructions that are in line to be carried out by a processor 115. In some embodiments, the instructions are load and store instructions (e.g., read, write, etc.). In some embodiments, the Load Store Unit (LSU) includes prefetch manager 105. The LSU may look at the data in history table 125 and assist in determining if other data will be prefetched.

Cache 135 (e.g., a file cache) can be any combination of hardware and/or software that stores data to be processed. In some embodiments, cache 135 is smaller (e.g., stores less data) and faster than other storage (e.g., storage 140) in host device 110. In some embodiments, cache 135 includes two or more separate cache systems that work in unison under the direction of kernel 120. In some embodiments, cache 135 can wholly or partially include random access memory (RAM) of host device 110. In some embodiments, cache 135 may be comprised of a read cache and a write cache. Cache 135 may be communicatively coupled to other components within host device 110.

Because a cache is relatively small in size, the data in the cache is frequently turned over. In various embodiments, data is kept in cache 135 according to one or more algorithms. For example, one algorithm can be least recently used (LRU). In an LRU cache, the data that has not been used for the longest period of time is flushed from the cache when new data needs to be written to the cache. In some embodiments, the algorithms that can manage a cache include, but are not limited to, pseudo least recently used (PLRU), first in first out (FIFO), last in first out (LIFO), etc.

Storage 140 can be any combination of hardware and/or software configured to store data. In some embodiments, storage 140 stores the programs and instructions to operate and manage prefetch manager 105, host device 110, kernel 120, first application 145, second application 150, and/or any other programs or modules configured to operate in host device 110. Storage 140 may be communicatively coupled to other components within host device 110.

In various embodiments, storage 140 includes one or more of cloud storage (public or private), tape drives, HDD, SAS drives, SSD, and any other storage medium known in the art. In some embodiments, storage 140 has a larger capacity than cache 135.

First application 145 can be any combination of hardware and/or software configured to carry out a function on a computing device (e.g., host device 110). In some embodiments, first application 145 is a software program (e.g., accounting software, system backup software, word processor, etc.). In some embodiments, first application 145 is a web application. In some embodiments, first application 145 is a set of instructions configured to perform one or more tasks. In some embodiments, first application 145 sends system calls to kernel 120 and/or processor 115 and receives the processed results from kernel 120 and/or processor 115. The system call may include a data set. The data set can include the line(s) of code (instructions) to process, the location the code is stored at (instruction address), where/if to write the results, etc.

Second application 150 can be any combination of hardware and/or software configured to carry out a function on a computing device (e.g., host device 110). In some embodiments, second application 150 is a software program (e.g., accounting software, system backup software, word processor, etc.). In some embodiments, second application 150 is a web application. In some embodiments, second application 150 is a set of instructions configured to perform one or more tasks. In some embodiments, second application 150 sends system calls to kernel 120 and/or processor 115 and receives the processed results from kernel 120 and/or processor 115. The system call may include a data set. The data set can include the line(s) of code to process (instructions), the location the code is stored (instruction address), where/if to write the results, etc.

Figure 2:
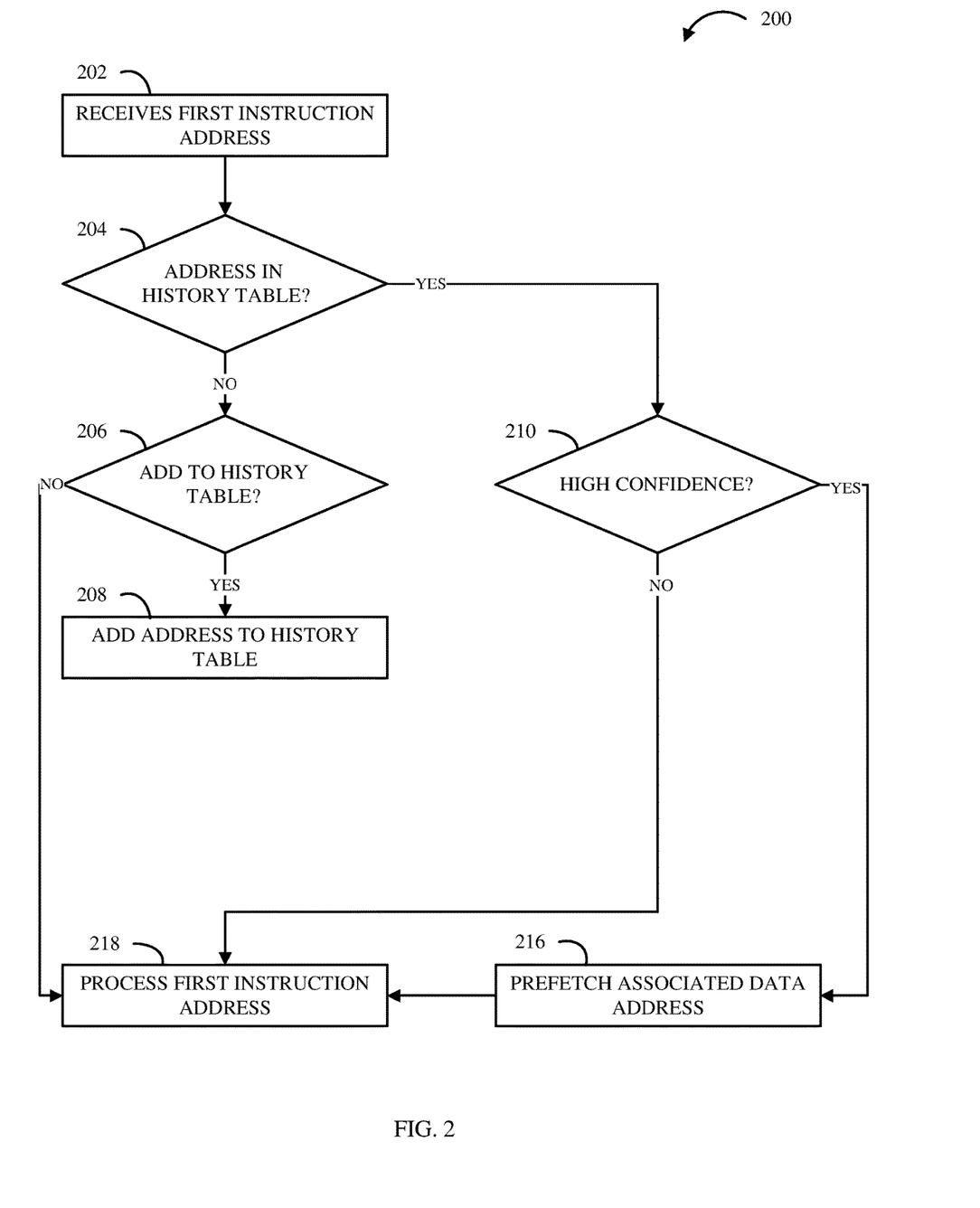
FIG. 2 illustrates a flow chart of an example method of prefetching, in accordance with some embodiments of the present disclosure.

FIG. 2 depicts a flowchart of an example method, method 200, of a prefetch manager (e.g., prefetch manager 105) utilizing a history table (e.g., history table 125) in accordance with various embodiments of the present disclosure. One or more of the advantages and improvements described above can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a prefetch manager (e.g., prefetch manager 105), a computing device (e.g., host device 110), and/or a different combination of hardware and/or software. In various embodiments, the operations of method 200 are performed by one or more of prefetch manager 105, host device 110, processor 115, kernel 120, history table 125, filter table 130, primary application 145, secondary application 150, and/or other computing devices (not shown) within computing environment 100.

At operation 202, prefetch manager 105 receives a first instruction address. In some embodiments, the first instruction address is received from processor 115. In some embodiments, the first instruction address is received from kernel 120. The first instruction address can be received as part of a system call that was initiated by first application 145.

At operation 204, prefetch manager 105 determines if the first instruction address is in history table 125. In some embodiments, the first instructions address is in history table 125 if there is an entry that includes the address. The address area of the entry can be queried to determine if there is a match. In various embodiments, if the address is in history table 125, it is a hit, and if the address is not in history table 125 it is a miss.

If it is determined the first instruction address is in history table 125 (e.g., history table hit) (decision tree "YES" branch), then prefetch manager 105 proceeds to operation 210. If it is determined the first instruction address is not in history table 125 (e.g., history table miss) (decision tree "NO" branch), then prefetch manager 105 proceeds to operation 206.

At operation 206, prefetch manager 105 determines if the first instruction address should be added to history table 125. In various embodiments, the factors that determine if the instruction address should be added to the history table may include: confidence score, number of times the instruction address has been processed, number of streams in which the instruction address is being used, and other similar factors. In general, the instruction address can be added to history table 125 if it is determined doing so may increase the overall efficiency of the computing system (e.g., host device 110). In some embodiments, the first instruction address can be added to the history table if it satisfies a set of conditions. The set of conditions can be based on the above factors (e.g., instruction address used in number of streams above a threshold, rate of address call above a threshold, a confidence score above a high threshold or below a low threshold, a combination of the foregoing, etc.).

If it is determined the first instruction address should be added to history table 125 (decision tree "YES" branch), then prefetch manager 105 proceeds to operation 208. If it is determined that the first instructions address should not be added to history table 125 (decision tree "NO" branch), then prefetch manager 105 proceeds to operation 218 (discussed in further detail below.)

At operation 208 prefetch manager 105 adds the first instruction address to history table 125. In some embodiments, the instruction address is added by creating an entry in the table. In some embodiments, adding an entry to history table 125 causes a previous entry to be evicted (removed, deleted, replaced, etc.).

In some embodiments, operation 208 includes generating (or creating) an entry. Creating the entry may include gathering the data that will be included with the entry. In some embodiments, creating the entry includes calculating (or determining) the confidence score, and the associated data address.

At operation 210 ("YES" at operation 204), prefetch manager 105 determines if the instruction address includes a high confidence level. In some embodiments, the confidence level is high if it is above a high threshold (or first threshold). The high threshold can be predetermined (e.g., any confidence above 5). In some embodiments, the high threshold can be dynamic. A dynamic high threshold can be determined by analyzing the entries in history table 125. The high confidence threshold can be set by ranking the entries and having a portion of the top ranked entries be above the confidence threshold (e.g., top 30%, top 15 rankings, etc.).

If it is determined the first instruction address has a high confidence (decision tree "YES" branch), then prefetch manager 105 proceeds to operation 216 (discussed in further detail below). If it is determined the first instruction address does not have a high confidence (decision tree "NO" branch), then prefetch manager 105 proceeds to operation 218 (discussed in further detail below).

At operation 216, prefetch manager 105 prefetches an associated data address. In some embodiments, the associated data address is prefetched by one or more prefetch engines. In some embodiments, prefetching includes reading the data stored at an associated data storage address from storage 140 to cache 135. In some embodiments, prefetching includes sending the prefetch request to a prefetch request queue (PRQ). The PRQ is a queue of prefetch requests that are carried out in an order configured to reduce the amount of time processor 115 waits for data to be read into cache 135. In some embodiments, kernel 120 executes the item in the PRQ when computing resources are available.

At operation 218, prefetch manager 105 processes the first instruction address. In some embodiments, processing the first instruction address includes completing all prefetch related operations. This can include notifying kernel 120 method 200 is complete, sending the first instruction address to processor 115, and/or other similar operations. In general, processing the first instruction address can be any operation that includes completing the system call from which the first instruction address was received. If the associated data address was prefetched in operation 216, it will be waiting in cache 135. Processor 115 (or kernel 120) can direct processor 115 to process the associated data address without a lag time while the data is being fetched from storage 140.

The method 200 highlights efficiencies that can be gained by adding filter table 130. Method 200 does not explicitly deal with entries that have a moderate confidence or a low confidence. This can have several unwanted effects. For example, consider a moderate confidence that is added to history table 125. First, the instruction address may displace a high confidence entry, preventing the high confidence entry from prefetching and/or requiring additional computing power to restore the high confidence entry in the future. Second, the associated data address will be prefetched and read into cache 135. This causes pollution in cache 135 and fills it with data that may not be processed and may lower the reading of other data (e.g., from second application 150) into cache 135. If a moderate confidence entry displaces a low confidence entry, computing resources may be used to attempt prefetching on the moderate confidence entry, when it would not have otherwise spent those resources. Also, if a moderate confidence is considered low, there may be efficiency losses by not attempting prefetching, when the prefetching would have otherwise been effective (e.g., read correct data in cache before the processor processes the data).

Figure 3:
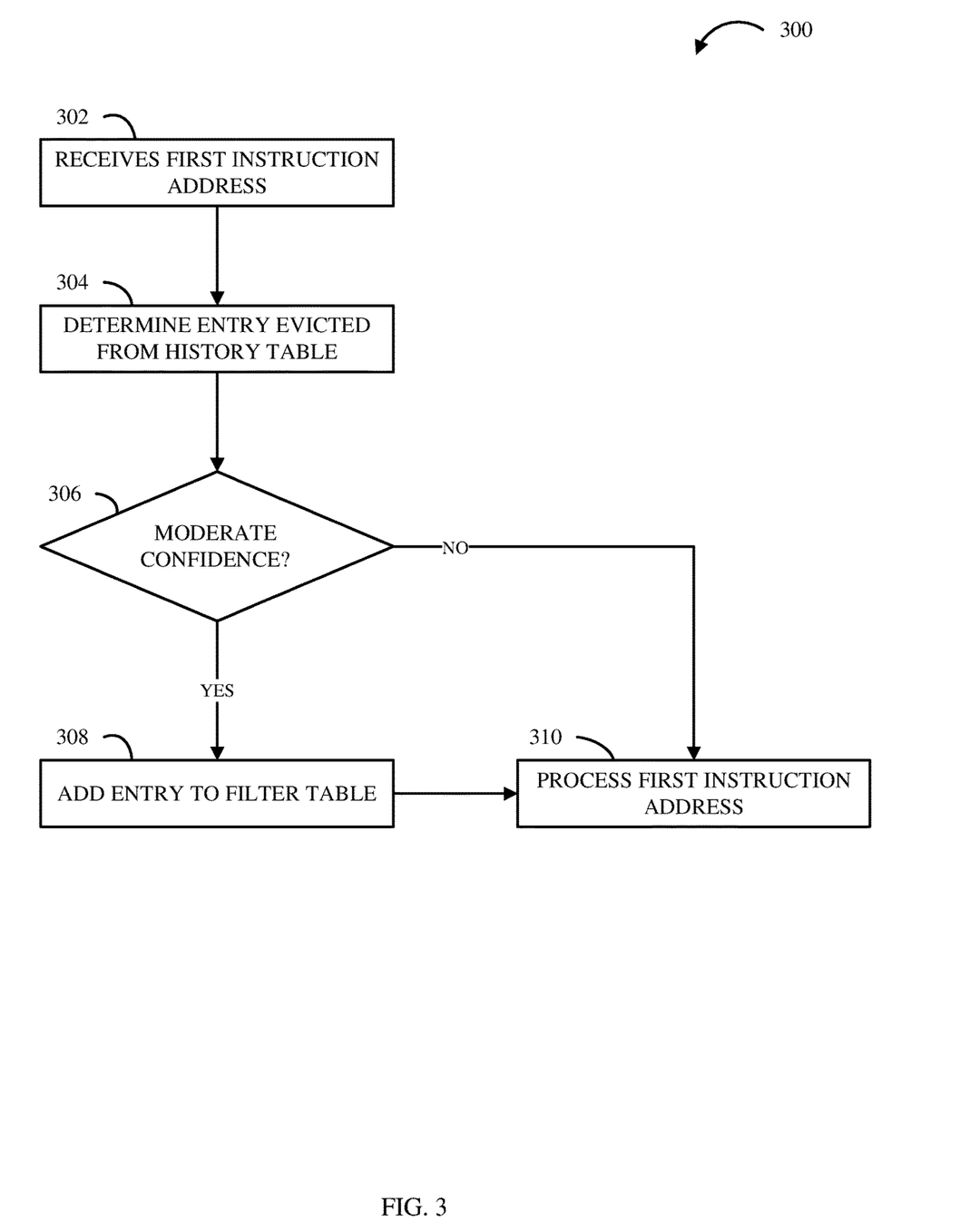
FIG. 3 illustrates a flow chart of an example method for adding an entry to a filter table, in accordance with some embodiments of the present disclosure.

FIG. 3 depicts a flowchart of an example method 300, that can add an entry to a filter table (e.g., filter table 130). One or more of the advantages and improvements described above utilizing a filter table can be realized by the method 300, consistent with various embodiments of the present disclosure.

Method 300 can include more or fewer operations than those depicted. Method 300 can include operations in different orders than the order depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, a prefetch manager (e.g., prefetch manager 105), a computing device (e.g., host device 110), and/or a different combination of hardware and/or software. In various embodiments, the operations of method 300 are performed by one or more of prefetch manager 105, host device 110, processor 115, kernel 120, history table 125, filter table 130, primary application 145, secondary application 150, and/or other computing devices (not shown) within computing environment 100.

At operation 302, prefetch manager 105 receives a first instruction address. In some embodiments, operation 302 can be consistent with operation 202 of FIG. 2. In some embodiments, the first instruction address is received from processor 115. In some embodiments, the first instruction address is received from kernel 120. The first instruction address can be received as part of a system call that was initiated by first application 145 (or second application 150). The first instruction address can be received after it becomes the first item in the LSU.

At operation 304, prefetch manager 105 determines an entry has been evicted from history table 125. In some embodiments, it is determined an entry has been evicted by monitoring history table 125 for changes. In some embodiments, it is determined an entry has been evicted if the first instruction address meets the requirements to be added to history table 125, and/or if it is added to history table 125 (e.g., operations 206 and/or 208 or method 200). Generally, the evicted entry will not be the entry associated with the first instruction address, although it may be in some cases.

At operation 306, prefetch manager 105 determines if the evicted entry has a moderate confidence level. In some embodiments, the confidence level is moderate if it is not a high confidence level or not a low confidence. In some embodiments, the confidence level is moderate if it falls above a low threshold and below a high threshold. The confidence levels can be static or dynamic. They may also be predetermined or based on the entries in history table 125. In some embodiments, there is 3-bit confidence (e.g., 0 to 7, where 0 is low and 7 is high), and any entry with a value of 2, 3, or 4 is moderate. In some embodiments, the confidence score can be any number of bits.

If it is determined the evicted entry has a moderate confidence score (decision tree "YES" branch), then prefetch manager 105 proceeds to operation 308. If it is determined that the evicted entry does not have a moderate confidence score (decision tree "NO" branch), then prefetch manager 105 proceeds to operation 310.

At operation 308, prefetch manager 105 adds the evicted entry (or $n^{th}$ entry) to filter table 130. In some embodiments, the entry is added to filter table 130 by storing the data in table. In some embodiments, a bloom filter is used on entries stored in filter table 130. The amount of data used for an entry in filter table 130 can be relatively small when compared to an entry in history table 125. An entry in filter table 130 essentially only needs the instruction address, the confidence score (in some embodiments), and some other peripheral information. An entry in history table 125 needs essentially everything in an entry of filter table 130 plus the associated data address, stream data, iteration data, etc.

In some embodiments, operation 308 includes generating (or creating) an entry. Creating the entry may include gathering the data that will be included with the entry. In some embodiments, creating the entry includes calculating (or determining) the confidence score, and the associated data address.

At operation 310, prefetch manager 105 processes the first instruction address. In some embodiments, operation 310 is consistent with operation 218 of FIG. 2. In some embodiments, processing the first instruction address includes completing all prefetch related operations. This can include notifying kernel 120 method 300 is complete, sending the first instruction address to processor 115, and/or other similar operations. In general processing the first instruction address can be any operation that includes completing the system call from which the first instruction address was received.

Figure 4:
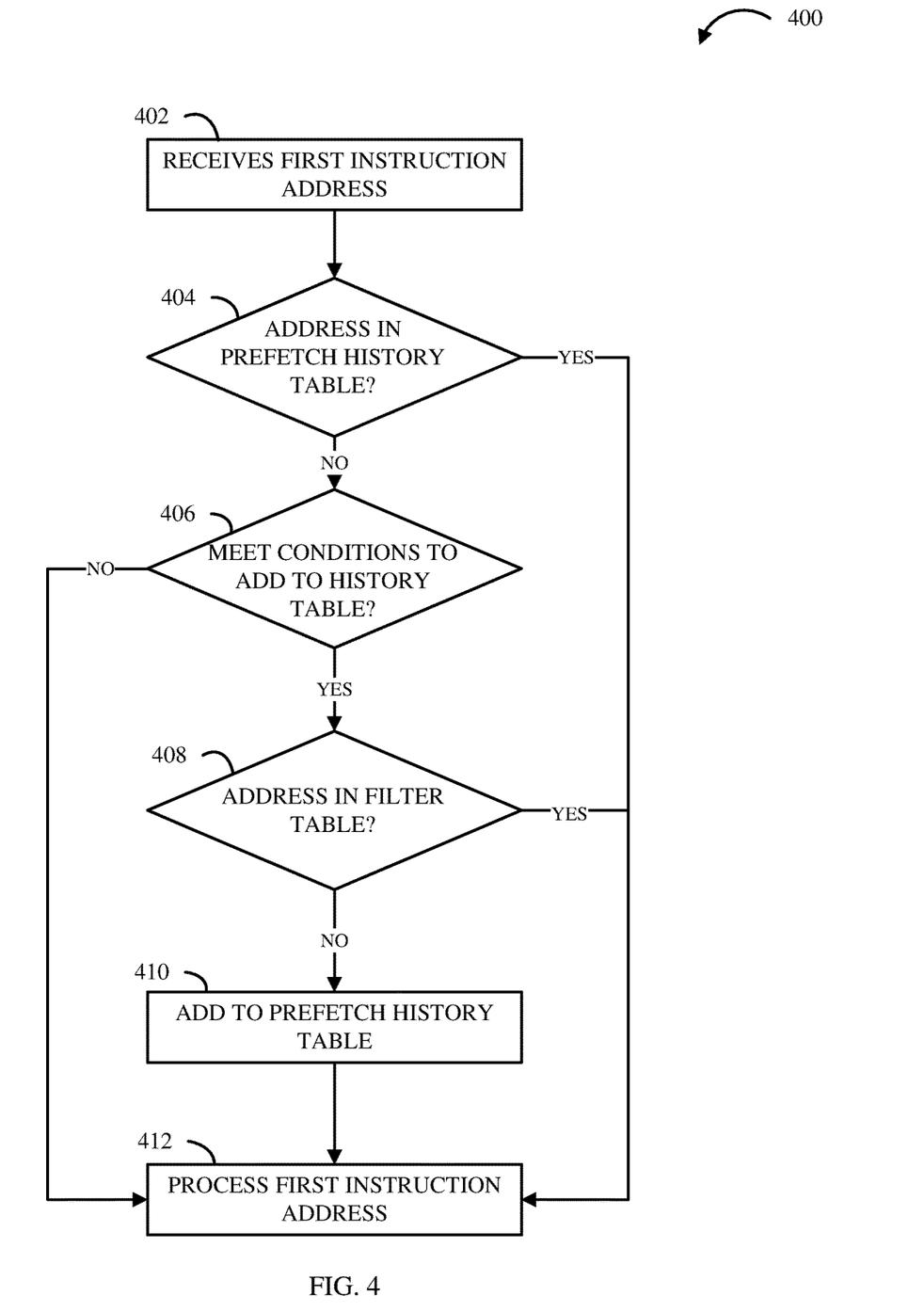
FIG. 4 illustrates a flow chart of an example method of preventing moderate confidence from being entered into a history table, in accordance with some embodiments of the present disclosure.

FIG. 4 depicts a flowchart of an example method 400, that can prevent a moderate confidence entry being entered into a history table (e.g., history table 125). One or more of the advantages and improvements described above utilizing a filter table can be realized by the method 400, consistent with various embodiments of the present disclosure.

Method 400 can include more or fewer operations than those depicted. Method 400 can include operations in different orders than the order depicted. Likewise, the method 400 can include operations that occur simultaneously rather than sequentially. Many modifications to the depicted method may be made by those skilled in the art without departing from the spirit and scope of the present disclosure. Method 400 can be implemented by one or more processors, a prefetch manager (e.g., prefetch manager 105), a computing device (e.g., host device 110), and/or a different combination of hardware and/or software. In various embodiments, the operations of method 400 are performed by one or more of prefetch manager 105, host device 110, processor 115, kernel 120, history table 125, filter table 130, primary application 145, secondary application 150, and/or other computing devices (not shown) within computing environment 100.

At operation 402, prefetch manager 105 receives a first instruction address. In some embodiments, operation 402 can be consistent with operation 202 of FIG. 2. In some embodiments, the first instruction address is received from processor 115. In some embodiments, the first instruction address is received from kernel 120. The first instruction address can be received as part of a system call that was initiated by first application 145 (or second application 150). The first instruction address can be received after it becomes the first item in the LSU.

At operation 404, prefetch manager 105 determines if the first instruction address is in history table 125. In some embodiments, operation 404 can be consistent with operation 204 of FIG. 2. In some embodiments, the first instructions address is in history table 125 if there is an entry that includes the address. The address area of the entry can be queried to determine if there is a match. In various embodiments, if the address is in history table 125, it is a hit and if the address is not in history table 125 it is a miss. History table 125 can be queried to determine if data is in a cache.

If it is determined the first instruction address is in history table 125 (e.g., history table hit) (decision tree "YES" branch) then prefetch manager 105 proceeds to operation 412 (discussed in further detail below). If it is determined the first instruction address is not in history table 125 (e.g., history table miss) (decision tree "NO" branch), then prefetch manager 105 proceeds to operation 406.

In some embodiments, if it is determined the first instruction address is in history table 125 operation 404 includes prefetching the associated data address. The prefetching can be consistent with operation 216 of FIG. 2. In some embodiments, prefetching includes reading the data stored at an associated data storage address from storage 140 to cache 135. In some embodiments, prefetching includes sending the prefetch request to a prefetch request queue (PRQ). The PRQ is a queue of prefetch requests that are carried out in an order configured to reduce the amount of time processor 115 waits for data to be read into cache 135. In some embodiments, kernel 120 executes the item in the PRQ when computing resources are available.

At operation 406, prefetch manager 105 determines if the first instruction address meets the conditions to be added to history table 125. In some embodiments, operation 406 can be consistent with operation 206 of FIG. 2. In various embodiments, the factors that determine if the instruction address should be added to the history table include: confidence score, number of times the instruction address has been processed, number of streams in which the instruction address is being used, and other similar factors. In general, the instruction address can be added to history table 125 if it is determined doing so may increase the overall efficiency of the computing system (e.g., host device 110).

If it is determined the first instruction address should be added to history table 125 (decision tree "YES" branch), then prefetch manager 105 proceeds to operations 408. If it is determined that first instruction address should not be added to history table 125 (decision tree "NO" branch), then prefetch manager 105 proceeds to operation 412 (discussed in further detail below.)

At operation 408, prefetch manager 105 determines if the first instruction address is in filter table 130. In some embodiments, the first instruction address is in filter table 130 if there is an entry that includes the address. The address area of the entry can be queried to determine if there is a match. In various embodiments, if the address is in filter table 130, it is a hit, and if the address is not in filter table 130, it is a miss. Filter table 130 can be queried to determine if data is in a cache using techniques consistent with those used in operation 404. In some embodiments, operation 408 includes using a bloom filter to determine if the instruction address is in filter table 130.

If it is determined the first instruction address is in filter table 130 (e.g., filter table hit) (decision tree "YES" branch) then prefetch manager 105 proceeds to operation 412 (discussed in further detail below). If it is determined the first instruction address is not in filter table 130 (e.g., filter table miss) (decision tree "NO" branch), then prefetch manager 105 proceeds to operation 410.

If it is determined the first instruction address is in filter table 130 this prevents entry of the instruction address into history table 125. Allowing the instruction address entry to displace a current entry may cause a negative effect of system performance. For example, if the moderate confidence entry displaced a high confidence entry and the associated data address is prefetched, then that prefetched data is less likely to be used and is causing cache pollution (e.g., reading data into the cache that will not be processed), thus wasting resources on fetching. The alternative is keeping the high confidence entry in history table 125, and as a result, all of the prefetched data is processed increasing the overall efficiency of the computing system. If the moderate confidence entry displaces a low confidence entry and the associated data address is prefetched, then that prefetched data is less likely to be used and causes cache pollution (e.g., reading data into the cache that will not be processed). The alternative is keeping the low confidence entry and not spending the computing resources to prefetch.

At operation 410 prefetch manager 105 adds the first instruction address to history table 125. In some embodiments, operation 410 can be consistent with operation 208 of FIG. 2. In some embodiments, the instruction address is added by creating an entry in the table. In some embodiments, adding an entry to history table 125 causes a previous entry to be evicted.

In some embodiments, operation 410 includes generating (or creating) an entry. Creating the entry may include gathering the data that will be included with the entry. In some embodiments, creating the entry includes calculating (or determining) the confidence score, and the associated data address.

At operation 412, prefetch manager 105 processes the first instruction address. In some embodiments, operation 412 is consistent with operation 218 of FIG. 2. In some embodiments, processing the first instruction address is completing all prefetch related operations. This can include notifying kernel 120 method 400 is complete, sending the first instruction address to processor 115, and/or other similar operations. In general processing the first instruction address can be any operation that includes completing the system call from which the first instruction address was received.

Figure 5:
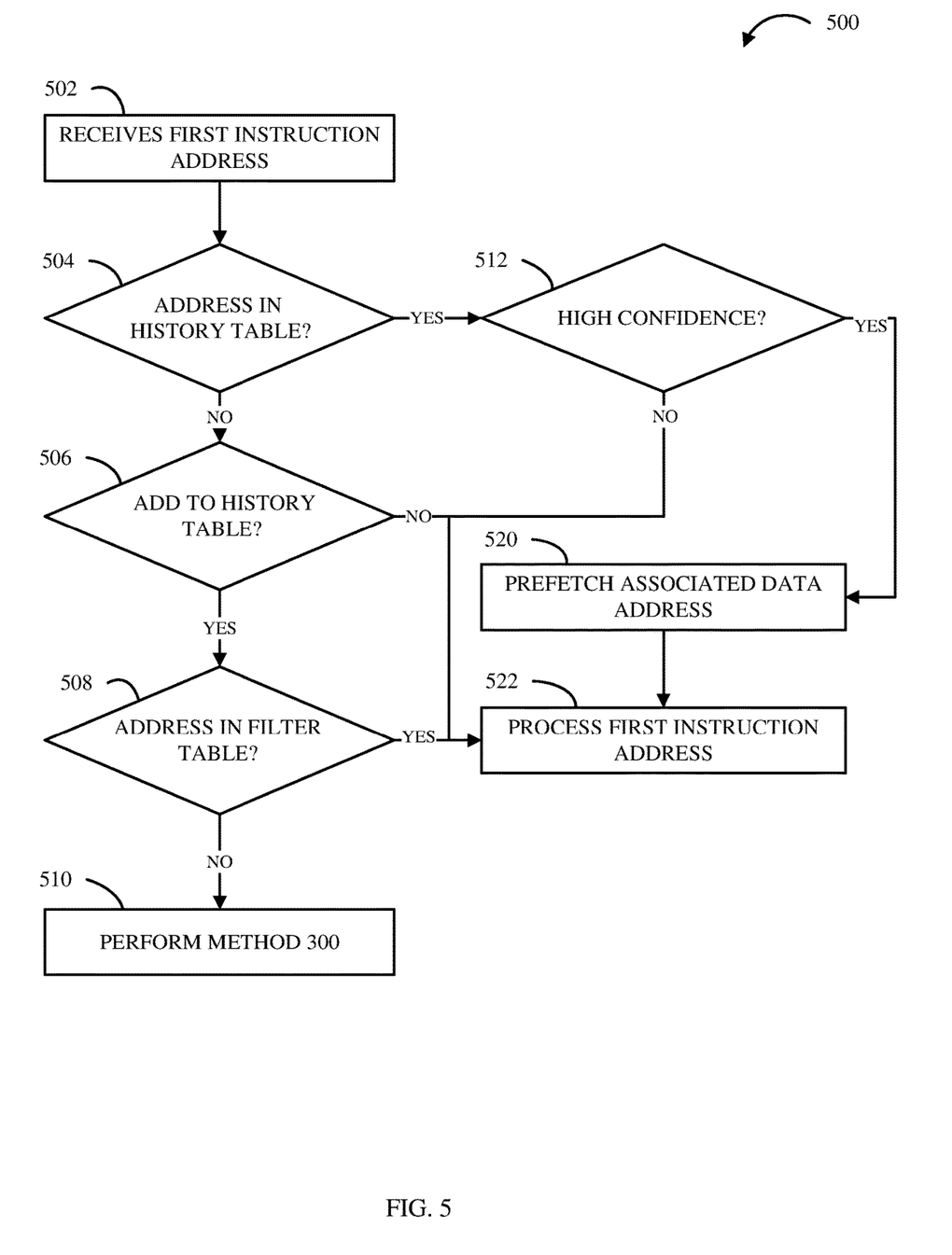
FIG. 5 illustrates a flow chart of an example method for prefetching with a filter table, in accordance with some embodiments of the present disclosure.

FIG. 5 depicts a flowchart of an example method 500 configured to increase the efficiency of a prefetch manager (e.g., prefetch manager 105). One or more of the advantages and improvements described above utilizing a filter table can be realized by the method 500, consistent with various embodiments of the present disclosure.

Method 500 can include more or fewer operations than those depicted. Method 500 can include operations in different orders than the order depicted. Likewise, the method 500 can include operations that occur simultaneously rather than sequentially. Many modifications to the depicted method may be made by those skilled in the art without departing from the spirit and scope of the present disclosure. Method 500 can be implemented by one or more processors, a prefetch manager (e.g., prefetch manager 105), a computing device (e.g., host device 110), and/or a different combination of hardware and/or software. In various embodiments, the operations of method 500 are performed by one or more of prefetch manager 105, host device 110, processor 115, kernel 120, history table 125, filter table 130, primary application 145, secondary application 150, and/or other computing devices (not shown) within computing environment 100.

At operation 502, prefetch manager 105 receives a first instruction address. In some embodiments, operation 502 is consistent with operation 202 of FIG. 2. In some embodiments, the first instruction address is received from processor 115. In some embodiments, the first instruction address is received from kernel 120. The first instruction address can be received as part of a system call that was initiated by first application 145. The first instruction address can be received after it becomes the first item in the LSU.

At operation 504, prefetch manager 105 determines if the first instruction address is in history table 125. In some embodiments, operation 504 if consistent with operation 204 of FIG. 2. In some embodiments, the first instruction address is in history table 125 if there is an entry that includes the address. The address area of the entries can be queried to determine if there is a match. In various embodiments, if the address is in history table 125, it is a hit and if the address is not in history table 125 it is a miss. History table 125 can be queried to determine if data is in a cache.

If it is determined the first instruction address is in history table 125 (e.g., history table hit) (decision tree "YES" branch) then prefetch manager 105 proceeds to operation 512 (discussed in further detail below). If it is determined the first instruction address is not in history table 125 (e.g., history table miss) (decision tree "NO" branch), then prefetch manager 105 proceeds to operation 506.

At operation 506, prefetch manager 105 determines if the first instruction address should be added to history table 125. In some embodiments, operation 506 can be consistent with operation 206 of FIG. 2. In various embodiments, the factors that determine if the instruction address should be added to the history table include: confidence score, number of times the instruction address has been processed, number of streams in which the instruction address is being used, and other similar factors. In general, the instruction address can be added to history table 125 if it is determined doing so may increase the overall efficiency of the computing system (e.g., host device 110).

If it is determined the first instruction address should be added to history table 125 (decision tree "YES" branch), then prefetch manager 105 proceeds to operation 508. If it is determined that first instructions address should not be added to history table 125 (decision tree "NO" branch), then prefetch manager 105 proceeds to operation 522 (discussed in further detail below.)

At operation 508, prefetch manager 105 determines if the first instruction address is in filter table 130. In some embodiments, operation 508 can be consistent with operation 408 of FIG. 4. In some embodiments, the first instruction address is in filter table 130 if there is an entry that includes the address. The address area of the entry can be queried to determine if there is a match. In various embodiments, if the address is in filter table 130, it is a hit, and if the address is not in filter table 130, it is a miss. Filter table 130 can be queried to determine if data is in a cache using techniques consistent with those used in operation 404. In some embodiments, operation 508 includes using a bloom filter to determine if the instruction address is in filter table 130.

If it is determined the first instruction address is in filter table 130 (e.g., filter table hit) (decision tree "YES" branch) then prefetch manager 105 proceeds to operation 522 (discussed in further detail below). If it is determined the first instruction address is not in filter table 130 (e.g., filter table miss) (decision tree "NO" branch), then prefetch manager 105 proceeds to operation 510.

At operation 510, prefetch manager 105 performs method 300. In some embodiments, operation 510 includes determining if the first instruction address should be added to filter table 130.

At operation 512, prefetch manager 105 determines if the instruction address confidence level is high. In some embodiments, operation 512 can be consistent with operation 210 of FIG. 2. In some embodiments, the confidence is high if it is above a high threshold (or first threshold). The high threshold can be predetermined (e.g., any confidence above 5). In some embodiments, the high threshold can be dynamic. A dynamic high threshold can be determined by analyzing the entries in history table 125. The high confidence threshold can be set by ranking the entries and having a portion of the top ranked be above the confidence threshold (e.g., top 30%, top 15 rankings, etc.).

If it is determined the first instruction address has a high confidence (decision tree "YES" branch), then prefetch manager 105 proceeds to operation 520 (discussed in further detail below). If it is determined the first instruction address does not have a high confidence (decision tree "NO" branch), then prefetch manager 105 proceeds to operation 522.

At operation 520, prefetch manager 105 prefetches an associated data address. In some embodiments, operation 520 is consistent with operation 216 of FIG. 2. In some embodiments, the associated data address is prefetched by one or more prefetch engines. In some embodiments, prefetching includes reading the data stored at an associated data storage address from storage 140 to cache 135. In some embodiments, prefetching includes sending the prefetch request to a prefetch request queue (PRQ). The PRQ is a queue of prefetch requests that are carried out in an order configured to reduce the amount of time processor 115 waits for data to be read into cache 135. In some embodiments, kernel 120 executes the item in the PRQ when computing resources are available At operation 522, prefetch manager 105 processes the first instruction address. In some embodiments, operation 522 is consistent with operation 218 of FIG. 2. In some embodiments, processing the first instruction address is completing all prefetch related operations. This can include notifying kernel 120 that method 200 is complete, sending the first instruction address to processor 115, and/or other similar operations. In general, processing the first instruction address can be any operation that includes completing the system call from which the first instruction address was received.

Figure 6:
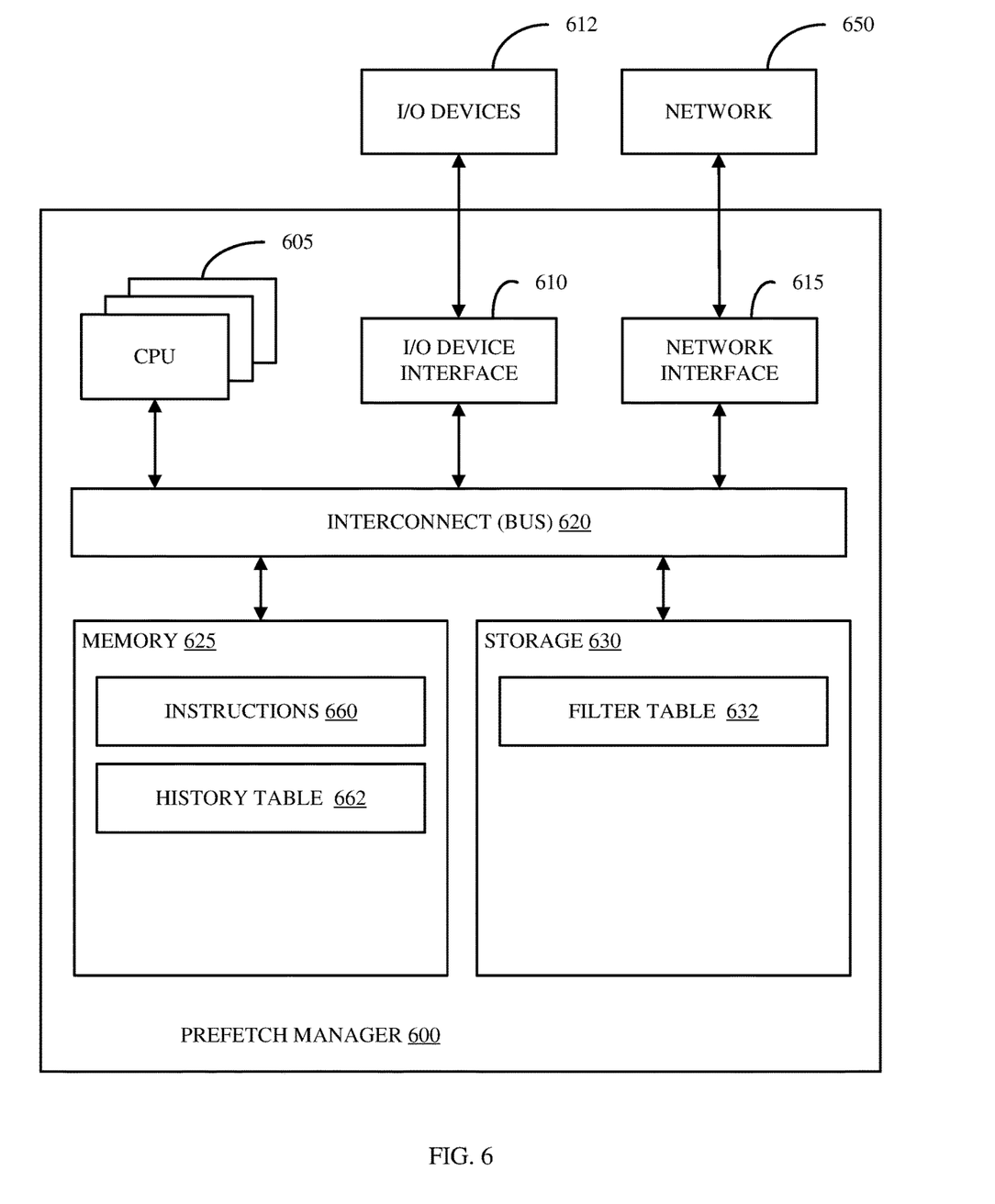
FIG. 6 illustrates a block diagram of an example prefetch manager, in accordance with some embodiments of the present disclosure.

FIG. 6 illustrates a block diagram of an example prefetch manager 600 in accordance with some embodiments of the present disclosure. In some embodiments prefetch manager 600 can perform the methods 200-500 as described in FIGS. 2-5. In some embodiments, prefetch manager 600 provides instructions for any of the methods 200-500 of FIGS. 2-5 to a client machine such that the client machine executes the method, or a portion of the method, based on the instructions provided by the prefetch manager 600. In some embodiments, prefetch manager 600 is consistent with prefetch manager 105 of FIG. 1.

The prefetch manager 600 includes a memory 625, storage 630, an interconnect 620 (e.g., BUS), one or more CPUs 605, an I/O device interface 610, I/O devices 612, and a network interface 615.

Each CPU 605 retrieves and executes programming instructions stored in the memory 625 or storage 630. The interconnect 620 is used to move data, such as programming instruction, between the CPUs 605, I/O device interface 610, storage 630, network interface 615, and memory 625. The interconnect 620 can be implemented using one or more buses. The CPUs 605 can be a single CPU, multiple CPUs, or a single CPU having multiple processing cores in some embodiments. In some embodiments, a CPU 605 can be a digital signal processor (DSP). In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 625 is generally included to be representative of a nonvolatile memory, such as a hard disk drive, solid state device (SSD), removable memory cards, optical storage, or flash memory devices. In an alternative embodiment, the storage 630 can be replaced by storage area-network (SAN) deices, the cloud, or other devices connected to the prefetch manager 600 via the I/O device interface 610 or a network 650 via the network interface 615.

In some embodiments, the memory 625 stores instructions 660, and history table 662 and the storage 630 stores filter table 632. However, in some embodiments, the instructions 660, history table 662, and filter table 632 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods 200-500 of FIG. 2-5.

History table 662 can be any combination of hardware and/or software configured to store information relating to information flow through one or more processors. In some embodiments, history table 662 is consistent with history table 125 of FIG. 1.

Filter table 632 can be any combination of hardware and/or software configured to store information relating to information flow through one or more processors. In some embodiments, filter table 632 is consistent with filter table 130 of FIG. 1.

In some embodiments, the I/O devices 612 include an interface capable of presenting information and receiving input. For example, I/O device 612 can present information to a user interacting with prefetch manager 600 and receive input from the user.

Prefetch manager 600 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/ act specified int eh flowchart and/or block diagram block or blocks.

The computer readable program instructions can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method performed by a processor, the method comprising:
receiving a first system call, wherein the first system call includes a first instruction address;
determining a first confidence score, wherein the first confidence score represents a likelihood a first associated data address that is referenced by the first instruction address will be processed;
creating a first entry comprising the first instruction address, the first associated data address, and the first confidence score;
determining the first instruction address is not present in a history table, wherein the history table includes a first plurality of entries, wherein each of the first plurality of entries comprises: an instruction address, an associated data address, and a confidence score;
adding the first entry to the history table, wherein a combination of the history table and a filter table is configured to give preference to maintaining, in the history table, entries with low confidence scores over entries with moderate confidence scores;
determining, in response to adding the first entry to the history table, a second entry is evicted from the history table, wherein the second entry includes a second instruction address, a second data address, and a second confidence score; and
entering the second entry into the filter table, wherein the entering of the second entry into the filter table is in response to determining the second confidence score is a moderate confidence score, wherein the moderate confidence score is any confidence score that is greater than a predefined low threshold and less than a predefined high threshold and a low confidence score is less than or equal to the predefined low threshold.

2. The computer-implemented method of claim 1, further comprising:
receiving a second system call, wherein the second system call includes the second instruction address;
creating the second entry comprising the second instruction address, the second associated data address, and the second confidence score;
determining the second entry satisfies a set of conditions to be entered into the history table;
comparing, in response to determining the second entry satisfies the set of conditions, the second entry to a second plurality of entries in the filter table;
determining the second entry matches one of the second plurality of entries;
preventing the second entry from being entered into the history table; and
processing the second system call.

3. The computer-implemented method of claim 1, wherein the second confidence score comprises a three-bit confidence score.

4. The computer-implemented method of claim 3, wherein the three-bit confidence score has a range of zero to seven, the predefined low threshold is two, and the predefined high threshold is five.

5. The computer-implemented method of claim 1, wherein the filter table is processed through a bloom filter.

6. The computer-implemented method of claim 1, wherein the filter table includes a second plurality of entries and each of the second plurality of entries in the filter table has been evicted from the history table.

7. The computer-implemented method of claim 1, further comprising:
evicting the second entry from the filter table, wherein the evicting the second entry from the filter table occurs in response to a predefined time passing after entering the second entry into the filter table.

8. A system comprising:
a processor;
a history table, wherein the history table includes a first plurality of entries, wherein each entry of the first plurality of entries comprises: an instruction address, an associated data address, and a confidence score;
a filter table, wherein the filter table includes a second plurality of entries, wherein each entry of the second plurality of entries was previously evicted from the history table; and
a computer-readable storage medium communicatively coupled to the processor and storing program instructions which, when executed by the processor, are configured to cause the processor to perform a method comprising:
receiving a first system call, wherein the first system call includes a first instruction address;
determining a first confidence score, wherein the first confidence score represents a likelihood a first associated data address that is referenced by the first instruction address will be processed;
creating a first entry comprising the first instruction address, the first associated data address, and the first confidence score;
determining the first instruction address is not present in the history table;
adding the first entry to the history table, wherein a combination of the history table and the filter table is configured to give preference to maintaining, in the history table, entries with low confidence scores over entries with moderate confidence scores;
determining, in response to adding the first entry to the history table, a second entry is evicted from the history table, wherein the second entry includes a second instruction address, a second data address, and a second confidence score; and
entering the second entry into the filter table wherein the entering of the second entry into the filter table is in response to determining the second confidence score is a moderate confidence score, and the moderate confidence score is any confidence score that is greater than a predefined low threshold and less than a predefined high threshold.

9. The system of claim 8, wherein the program instructions are further configured to cause the processor to perform operations comprising:
receiving a second system call, wherein the second system call includes the second instruction address;
creating the second entry comprising the second instruction address, the second data address, and the second confidence score;
determining the second entry satisfies a set of conditions to be entered into the history table;
comparing, in response to determining the second entry satisfies the set of conditions, the second entry to the second plurality of entries in the filter table;
determining the second entry matches one of the second plurality of entries;
preventing the second entry from being entered into the history table; and
processing the second system call.

10. The system of claim 8, wherein the second confidence score comprises a three-bit confidence score.

11. The system of claim 8, wherein the filter table is processed through a bloom filter.

12. A computer program product, the computer program product comprising a non-transitory computer readable storage medium having program instructions embodied therewith, the program instructions executable by a processing unit to cause the processing unit to perform a method comprising:
receiving a first system call, wherein the first system call includes a first instruction address;
determining a first confidence score, wherein the first confidence score represents a likelihood a first associated data address that is referenced by the first instruction address will be processed;
creating a first entry comprising the first instruction address, the first associated data address, and the first confidence score;
determining the first instruction address is not present in a history table, wherein the history table includes a first plurality of entries, wherein each of the first plurality of entries comprises: an instruction address, an associated data address, and a confidence score;
adding the first entry to the history table, wherein a combination of the history table and a filter table is configured to give preference to maintaining, in the history table, entries with low confidence scores over entries with moderate confidence scores;
determining, in response to adding the first entry to the history table, a second entry from the history table, wherein the second entry includes a second instruction address, a second data address, and the second confidence score; and
entering the second entry into the filter table, wherein the entering of the second entry into the filter table is in response to determining the second confidence score is a moderate confidence score, wherein the moderate confidence score is any confidence score that is greater than a predefined low threshold and less than a predefined high threshold and a low confidence score is less than or equal to the predefined low threshold.

13. The computer program product of claim 12, wherein the program instructions are further configured to cause the processing unit to perform the method comprising:
receiving a second system call, wherein the second system call includes the second instruction address;
creating the second entry comprising the second instruction address, the second associated data address, and the second confidence score;
determining the second entry satisfies a set of conditions to be entered into the history table;
comparing, in response to determining the second entry satisfies the set of conditions, the second entry to a second plurality of entries in the filter table;
determining the second entry matches one of the second plurality of entries;
preventing the second entry from being entered into the history table; and
processing the second system call.

14. The computer program product of claim 12, wherein the second confidence score comprises a three-bit confidence score.

15. The computer program product of claim 12, wherein the filter table is processed through a bloom filter.

\* \* \* \* \*